Sept. 11, 1923.
R. C. BURNLEY
1,467,753
RAT TRAP
Filed Aug. 23, 1922    2 Sheets-Sheet 1
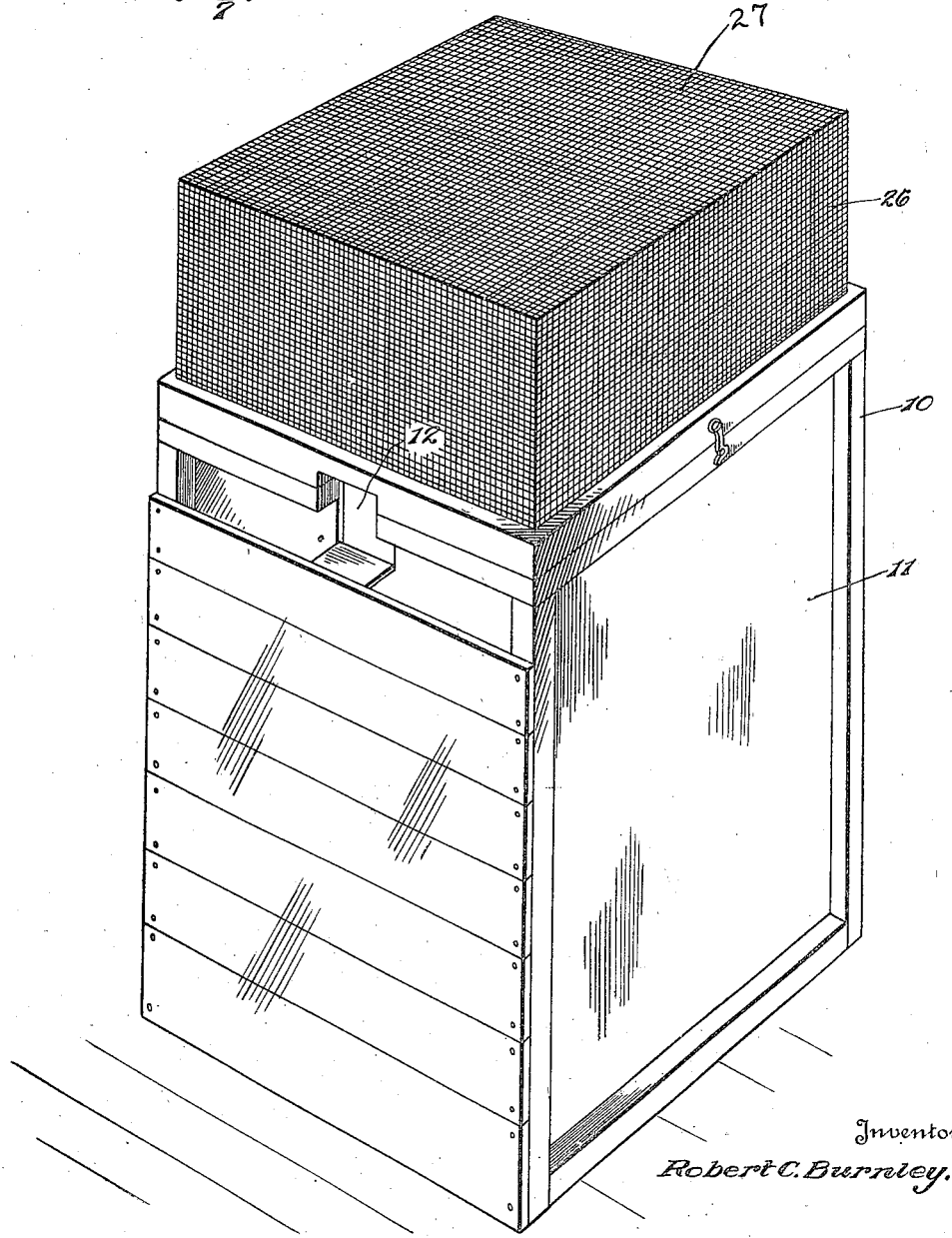

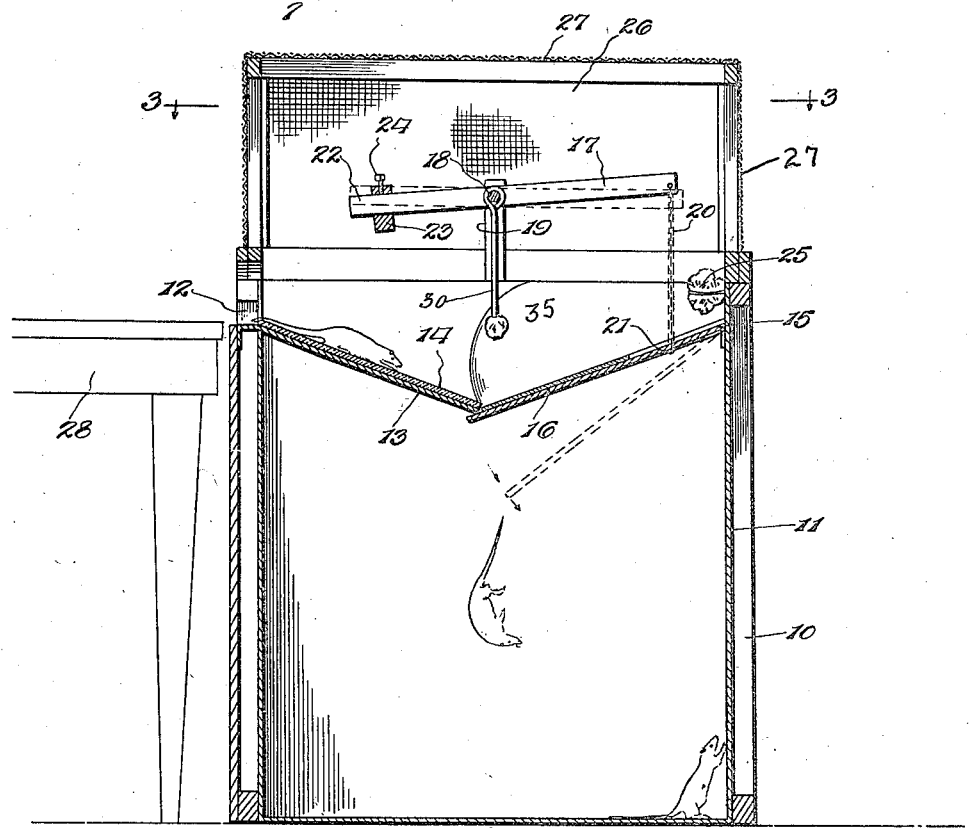
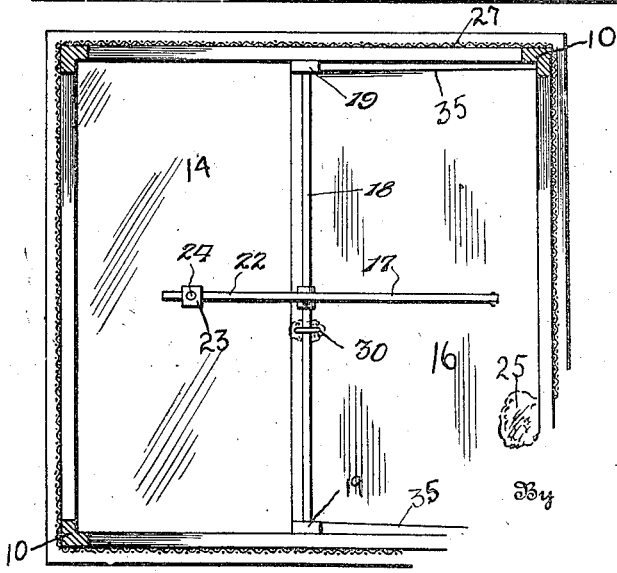

Patented Sept. 11, 1923.

1,467,753

UNITED STATES PATENT OFFICE.

ROBERT C. BURNLEY, OF HARTSVILLE, TENNESSEE.

RAT TRAP.

Application filed August 23, 1922. Serial No. 583,322.

*To all whom it may concern:*

Be it known that I, ROBERT C. BURNLEY, citizen of the United States, residing at Hartsville, in the county of Trousdale and State of Tennessee, have invented certain new and useful Improvements in Rat Traps, of which the following is a specification.

The present invention relates to a rat trap and the main object of the invention is to construct the device so that if a rat or mouse once enters the same there is no means of escape.

Another object of the invention is to provide means in the trap for adjusting the same to larger or smaller rodents, or in other words the trap may be set to catch not only mice but also the largest rats.

One embodiment of the invention is illustrated in the accompanying drawings, and Fig. 1 shows a perspective view of the trap;

Fig. 2 is a vertical section thereof, and

Fig. 3 is a horizontal section along line 3—3 of Fig. 2.

In the preferred construction shown in the accompanying drawings the trap consists of a skeleton or cabinet 10 which may be made of wood or iron or any other suitable material. Within this skeleton is inserted a tank 11 preferably made of sheet metal so as to be watertight. This tank is provided with a bottom and four sides while it is open at the top. On the front side near the top is shown a small doorway or entrance 12 and level with the lower edge thereof is a slanting floor 13 reaching downwardly from the entrance 12 to about midway in the trap. This floor is rigidly secured in the trap and may be provided with a sheet of glass 14 on top thereof or in any other manner furnished with a bright and polished surface.

On the opposite side to the entrance 12 is hinged as at 15 a trap door 16 having side walls 35 and which reaches inwardly from the hinged end to meet the floor 13 and extends slightly beyond the same as seen in Fig. 2. In this manner the edge of the free end of the trap door 16 will abut against the lower edge of the floor 13 so as to limit its upward movement. This trap door 16 is held in the lifted position, as seen in full lines in Fig. 2, by means of a balance beam 17 fulcrumed as at 18 on a pair of standards 19. The rear end of the beam 17 carries a chain 20, the lower end of which is attached to the trap door 16 as at 21. This beam 17, which may be made of wood or metal, extends in opposite direction to the chain 20 with an arm 22. Upon the latter is slidably carried a weight 23 which may be secured by means of a set screw 24 in adjustable position along the arm 22. By setting the weight 23 in a suitable position on the arm 22 it will now be evident that a very fine adjustment may be given to the trap door 16 so that the slightest pressure on top thereof will cause the same to drop down into the dotted position shown in Figure 2.

At 25 just above the hinge 15 on the rear wall of the trap is shown a bait which will attract the attention of a rodent entering through the door 12. As soon as he has arrived on the floor 13 he will pass down to the trap door 16 assisted by the polished surface 14 and his weight will then cause the trap door 16 to fall and himself to disappear in the tank 11.

The top of the tank is preferably closed by means of a hood 26 which fits in the skeleton or cabinet 10 and covers the balance beam 17 permitting oscillation of the latter. This hood may have a screen covering 27 on the top and four sides as seen in the figure.

The tank 11 may be partly filled with water for drowning the rats. Instead of the table 28 reaching up to the entrance 12 of the trap, a bridge or slanting floor may be leaned against the trap.

At times a second bait carrier may be provided in the form of a rod 30 preferably loosely suspended from the hinge pin 18 to swing back and forth over the edge of the slanting floor 13. The bait is hung high enough above this edge to compel the rodent to rise on his hind legs to reach it. If he attempts to lean against the bait, the latter will immediately swing away from him, when he will most likely over balance himself and fall upon the trap door, which then gives way and dumps him into the tank 11.

Having thus described the invention, what is claimed as new is:

1. A rat trap comprising a cabinet having a slanting floor raised above its bottom and terminating substantially along a medial line across the cabinet, a tank in the cabinet below said floor, an entrance being provided in a wall of the cabinet above said floor, a slanting trap door hinged in the tank and adapted to abut with its free edge against said floor and means for yieldably holding the trap door in the abutting position.

2. A rat trap comprising a cabinet having a slanting floor raised above its bottom and terminating substantially along a medial line across the cabinet, a tank in the cabinet below said floor, an entrance being provided in a wall of the cabinet above said floor, a slanting trap door hinged in the tank and adapted to abut with its free edge against said floor, means for yieldably holding the trap door in the abutting position, said means including a two armed lever journaled in suitable bearings in the cabinet, one arm of said lever carrying a weight and the other arm having positive connection with said trap door.

In testimony whereof I affix my signature.

ROBERT C. BURNLEY. [L. S.]